US005620305A

United States Patent [19]

McArdle

[11] Patent Number: 5,620,305
[45] Date of Patent: Apr. 15, 1997

[54] HUB FOR ROTARY WING AIRCRAFT

[75] Inventor: Francis H. McArdle, Norristown, Pa.

[73] Assignee: The Boeing Company, Seattle, Wash.

[21] Appl. No.: 406,576

[22] Filed: Mar. 20, 1995

[51] Int. Cl.$^6$ .................................................. B64C 27/48
[52] U.S. Cl. ........................................ 416/134 A; 416/140
[58] Field of Search .............................. 416/102, 134 A, 416/140, 148

[56] References Cited

U.S. PATENT DOCUMENTS

| | | | |
|---|---|---|---|
| 3,926,536 | 12/1975 | Ciastula et al. | 416/135 |
| 4,099,892 | 7/1978 | Martin | 416/134 A |
| 4,153,390 | 5/1979 | Weiland | 416/138 |
| 4,163,630 | 12/1979 | Weiland | 416/134 |
| 4,203,709 | 5/1980 | Watson | 416/134 |
| 4,231,705 | 11/1980 | Watson | 416/108 |
| 4,251,188 | 2/1981 | Schwarz et al. | 416/134 A |
| 4,257,739 | 3/1981 | Covington et al. | 416/140 A |
| 4,264,277 | 4/1981 | McCafferty | 416/140 A |
| 4,281,966 | 8/1981 | Duret et al. | 416/134 |
| 4,299,539 | 11/1981 | Schwarz et al. | 416/134 A |
| 4,306,836 | 12/1981 | Meyerjak | 416/134 |
| 4,349,316 | 9/1982 | Hughes et al. | 416/104 |
| 4,369,019 | 1/1983 | Lovera et al. | 416/134 |
| 4,496,284 | 1/1985 | Watson | 416/138 |
| 4,512,717 | 4/1985 | Pancotti et al. | 416/134 |
| 4,568,245 | 2/1986 | Hibyan et al. | 416/134 |
| 4,568,246 | 2/1986 | Hibyan et al. | 416/134 |
| 4,585,394 | 4/1986 | Schwarz et al. | 416/134 A |
| 4,629,644 | 12/1986 | Matuska | 416/148 |
| 4,755,106 | 7/1988 | Coffy | 416/148 |
| 4,886,419 | 12/1989 | McCafferty | 416/134 |
| 4,915,585 | 4/1990 | Guimbal | 416/140 |
| 5,059,094 | 10/1991 | Robinson et al. | 416/134 A |
| 5,116,209 | 5/1992 | Anglade et al. | 416/107 |
| 5,135,357 | 8/1992 | Pancotti | 416/131 |
| 5,145,321 | 9/1992 | Flux et al. | 416/244 |
| 5,156,527 | 10/1992 | Pancotti | 416/131 |
| 5,165,853 | 11/1992 | Pancotti | 416/134 |
| 5,228,834 | 7/1993 | Yamamoto et al. | 416/140 |

FOREIGN PATENT DOCUMENTS

| | | | |
|---|---|---|---|
| 0482215 | 9/1947 | Canada | 416/148 |
| 0751109 | 6/1958 | United Kingdom | 416/102 |

Primary Examiner—Edward K. Look
Assistant Examiner—Mark Sgantzos
Attorney, Agent, or Firm—Jones, Tullar & Cooper, P.C.

[57] ABSTRACT

A rotor hub for a rotary wing aircraft is described which allows the use of more than three blades on the rotor head while providing all of the required functional features. The rotor head is constructed using a central barrel to which is attached a plurality of blade attachment points on its exterior surface. The pitch arm actuating points are located inside of the hub barrel, extending from the outer surface into the hub barrel through arcuate slots in the barrel. The hub is particularly adapted for use with tilt rotor rotary wing aircraft and provides a negative Delta 3 blade pitch input in response to wind gusts and abrupt pilot control inputs.

18 Claims, 8 Drawing Sheets

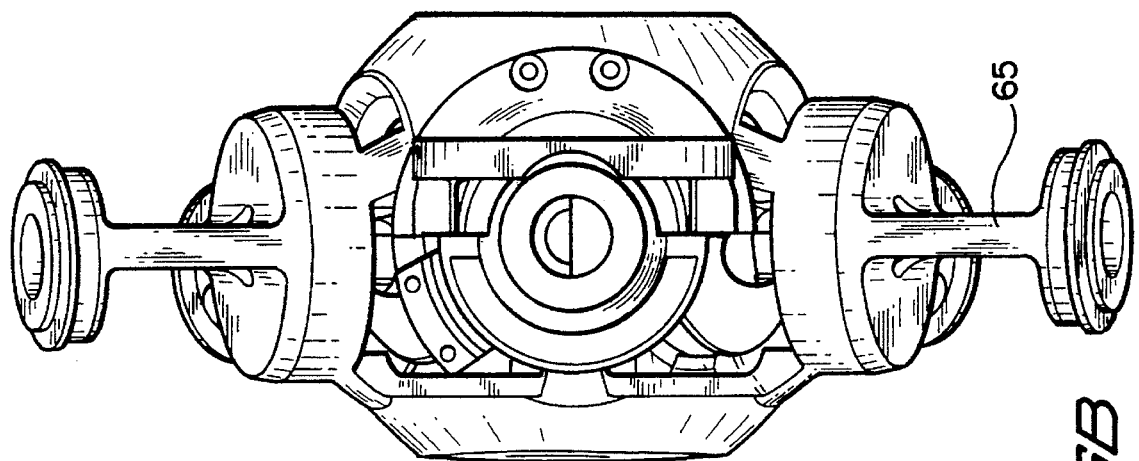
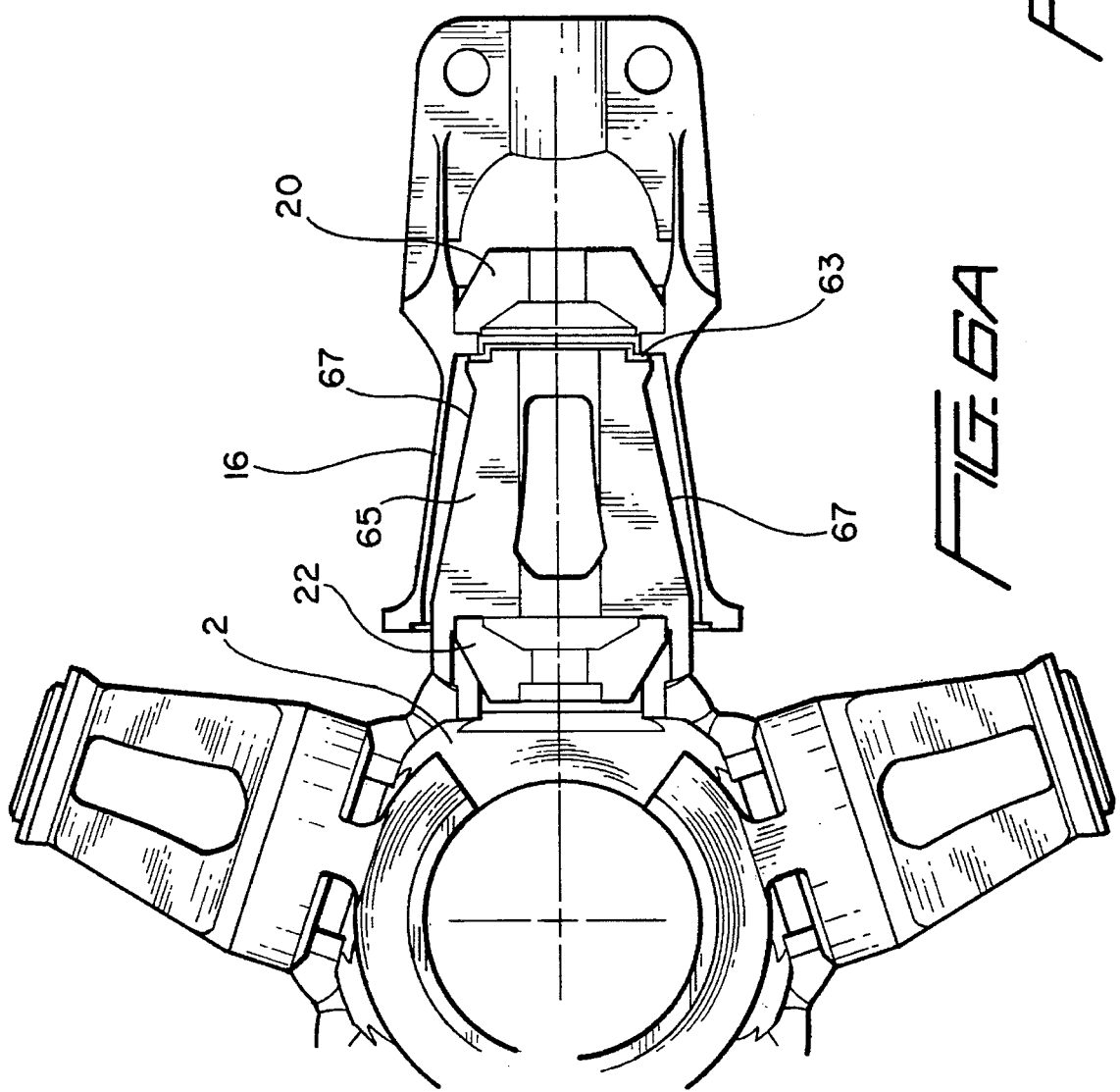

HUB FOR ROTARY WING AIRCRAFT

BACKGROUND OF THE INVENTION

This invention relates in general to a rotor hub for rotary wing aircraft and in particular for a gimbaled hub for a tilt rotor aircraft having the capability of flying as a conventional helicopter and, by tilting the rotors to a forward facing position, can fly as a fixed wing propeller driven aircraft.

In the past, these aircraft with gimbaled hubs have been restricted to the use of three bladed propellers or prop-rotors because of the use of conventional helicopter rotor design having the blade pitch control mechanism external to the rotor hub. A tilt rotor aircraft using gimbaled rotors allows the rotor hubs to be tilted universally about their rotational axes to provide the effect of a blade flap hinge in a conventional helicopter rotor and to assure an appropriate Delta 3 response of the rotor when the rotor is subjected to wind gust inputs or other sudden control inputs by the pilot. The term Delta three will be further defined in the detailed description of the Invention. In the prior art and in this description, the gimbal mounting of the rotor is accomplished by the use of a pair of spherical elastomeric bearings for supporting the rotor hub on the rotor shaft. This teetering ability of the rotor on the spherical bearing serves to provide the flap axis of the rotor blades.

For tilt rotor aircraft, the proper gust response is often designated "flap up—pitch up" where in a conventional helicopter, the proper gust response is "flap up—pitch down". Delta 3 refers to the angle measured from the rotor rotational axis to the blade pitch arm attachment point and measures the offset between the blade pitch arm attachment point and the flap axis of that same blade. Thus, in a conventional helicopter, when a blade tip is raised about its flap axis (flap-up), the blade pitch is reduced (pitch down). In contrast, in a tilt rotor aircraft, when the blade tip is raised about the flap axis (flap up), the blade pitch is increased (pitch up). For convenience, in this description, flap up-pitch down will be designated as positive Delta 3 and flap up-pitch up will be designated as negative Delta 3.

In the prior art, the amount of Delta 3 that could be built into the rotor design was limited because the blade pitch arms were located outside the rotor hub. With more than three blades on the hub, the Delta 3 angle is severely restricted because with the conventional design with the pitch arms external to the hub, the pitch arms interfere witch each other at very low Delta 3 inputs. It is desirable to have more than three blades on a tilt rotor aircraft in order to reduce vibration and noise in transitional and fixed wing operation modes. With the present invention, the number of blades which can be accommodated on the hub which can provide sufficient Delta 3 motion is increased to five, six, seven or even eight blades. This increased number of blades and the resulting smoother flight greatly reduces pilot fatigue as well as reducing vibration induced mechanical failures. In addition, in the case of a civil tilt rotor transport, the additional blades provide a greatly increased level of passenger comfort.

SUMMARY OF THE INVENTION

The present invention overcomes the disadvantages of the prior art by the use of a compact barrel-shaped rotor hub which provides for mounting of the rotor blades such that the pitch arms of the blades are located inside of the barrel of the hub and arranged so that relatively large blade pitch motions are possible without mechanical interference between the individual pitch arms. Individual inner cones are attached to the outer surface of the hub barrel for supporting the individual blades. This cone shaped inner members supplies support for an outer elastomeric blade pitch bearing and an cone shaped outer member, enclosing the inner member, attaches to an inner elastomeric bearing and the pitch arm assembly for supporting the inner end of the rotor blades. Thus each blade is attached to the hub for rotation about the blade pitch axis by a pair of elastomeric bearings. These bearings serve to react the blade centrifugal forces equally and also react blade moments as a couple.

An alternative embodiment of the invention substitutes a flexure structure in place of the inner member. This flexure, which can deflect about an axis perpendicular to the rotor spin axis, serves as a coning flexure accommodating the rotor cone angle differences in fixed wing cruise mode and the hover mode. This flexure can be of metal or of a composite structure. The use of this flexure reduces the constant rotor blade bending which occurs under these conditions in the first embodiment

BRIEF DESCRIPTION OF THE DRAWINGS

FIG. 6a is a plan view of the hub with coning flexures.

FIG. 6b is a side view of FIG. 6a.

DETAILED DESCRIPTION OF THE PREFERRED EMBODIMENT

Figure 1:
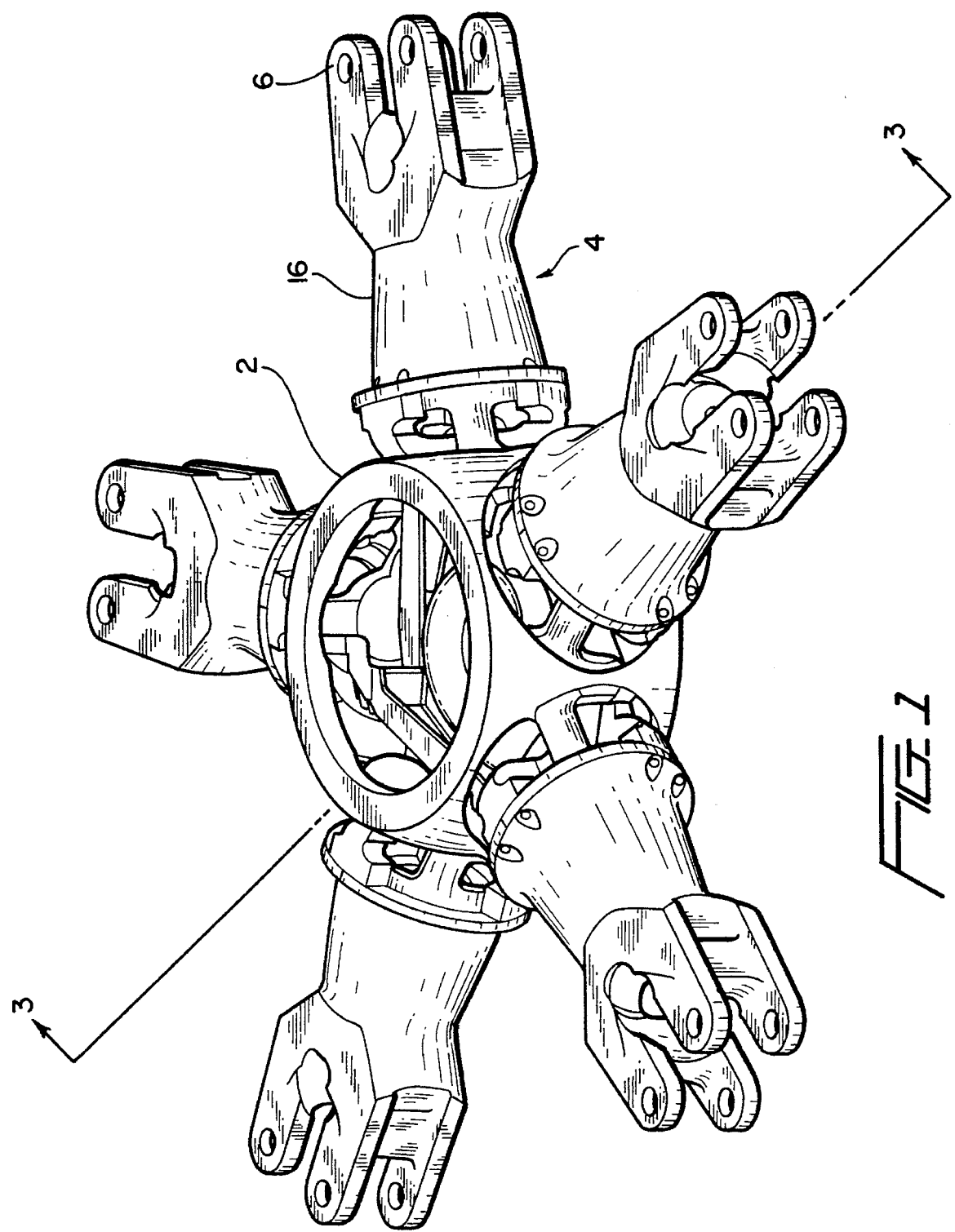
FIG. 1 is an isometric view of the hub of the invention.

Referring now to FIG. 1, there is shown an isometric view of a rotor hub according to the invention. The hub barrel 2 is formed in a barrel shape and is attached to the rotor shaft as described below. In the hub of this illustration, there is shown a hub for a five bladed rotor. The blade arms 4 are composed of a cone shapes outer member 16 having blade attachment members 6 at the end of each outer member.

Figure 2:
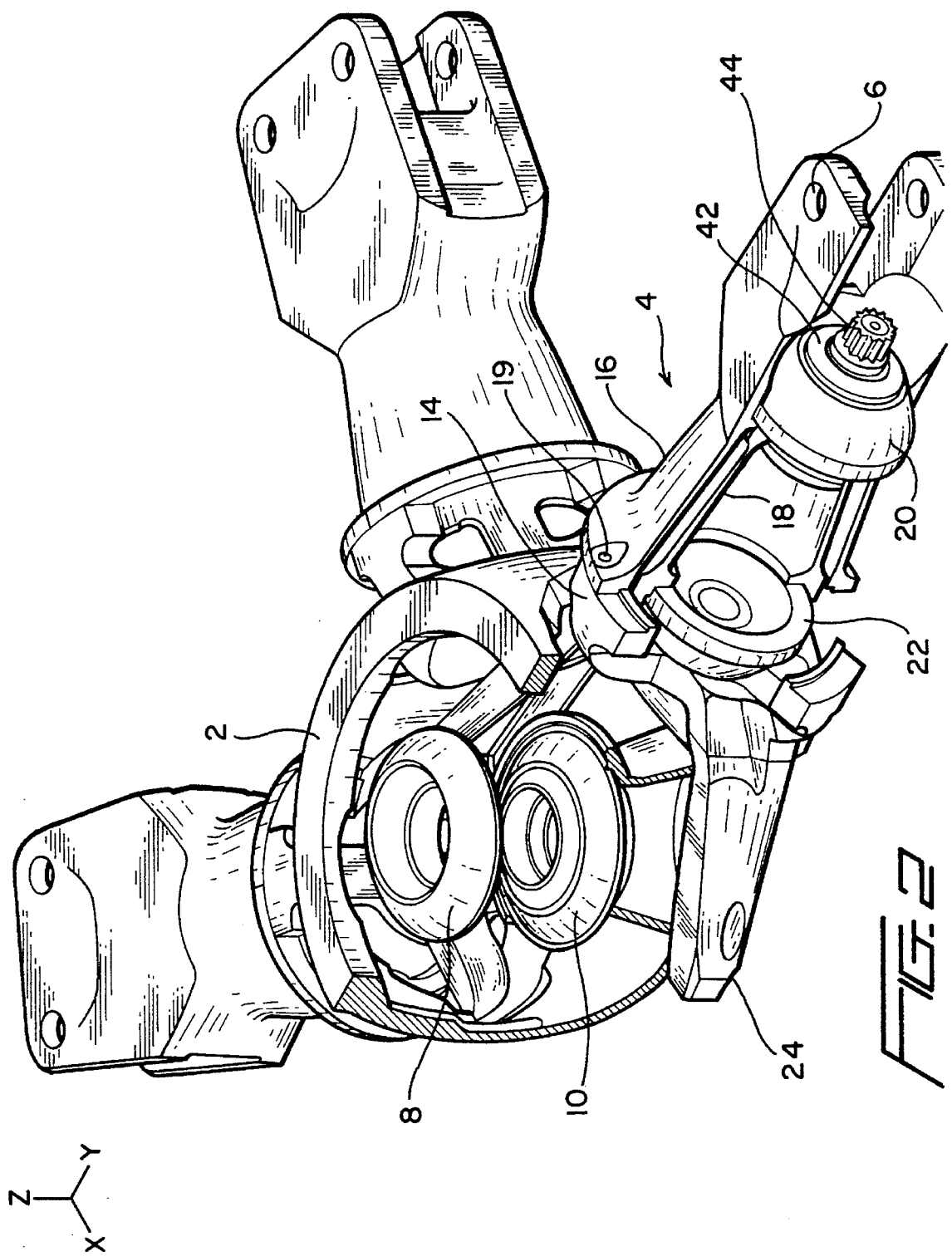
FIG. 2 is a partial sectional isometric view of the rotor support bearings of the invention.
Figure 4:
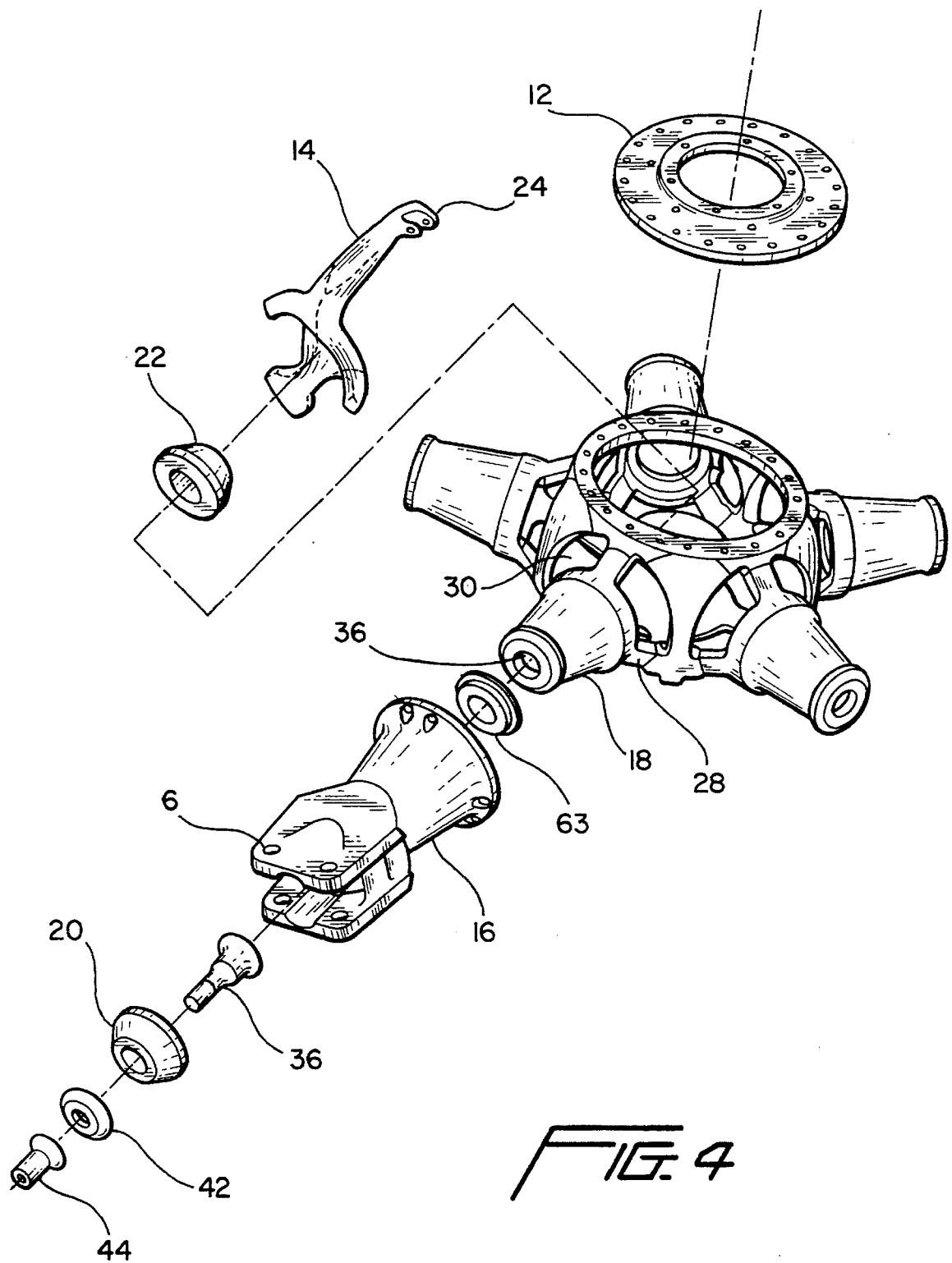
FIG. 4 is an exploded view of one arm of the hub of the invention.

Referring now to FIG. 2, a partial isometric view of the hub illustrates the hub support bearings of the rotor of the invention. The hub is supported on a pair of spherical elastomeric bearings well known in the art. The upper bearing is shown at 8 and the lower bearing at 10. This bearing assembly is retained in the hub assembly by the cover plate 12 shown in FIG. 4. This spherical elastomeric bearing allows the hub to teeter in all directions about the rotor axis. This pair of bearings serves the functions of the individual rotor flap and lag bearings of a conventional helicopter articulated rotor head and allows the rotor hub to tilt in all directions. FIG. 4 also illustrates the construction details of the individual blade arms 4.

These blade arms are composed of a hollow outer member 16 which is attached to the Ditch arm 14 by means of bolts 19 or similar fasteners. Inside the outer member 16 there is provided an inner member 18. This inner member, in conjunction with the outer member 16 and pitch housing 15 provide the mounting surfaces for elastomeric blade pitch bearings 20 and 22. These bearings support the outer member 16 for rotation about the blade pitch axis. This blade support assembly will be described in more detail in connection with the detailed descriptions of FIGS. 4 and 5 below. As can be seen in this Figure, the blade pitch arm attachment point 24 is positioned inside the hub barrel 2. It is this feature, described in more detail below, that allows the incorporation of 4, 5, or more blades in the tilt rotor hub of the invention.

Figure 3:
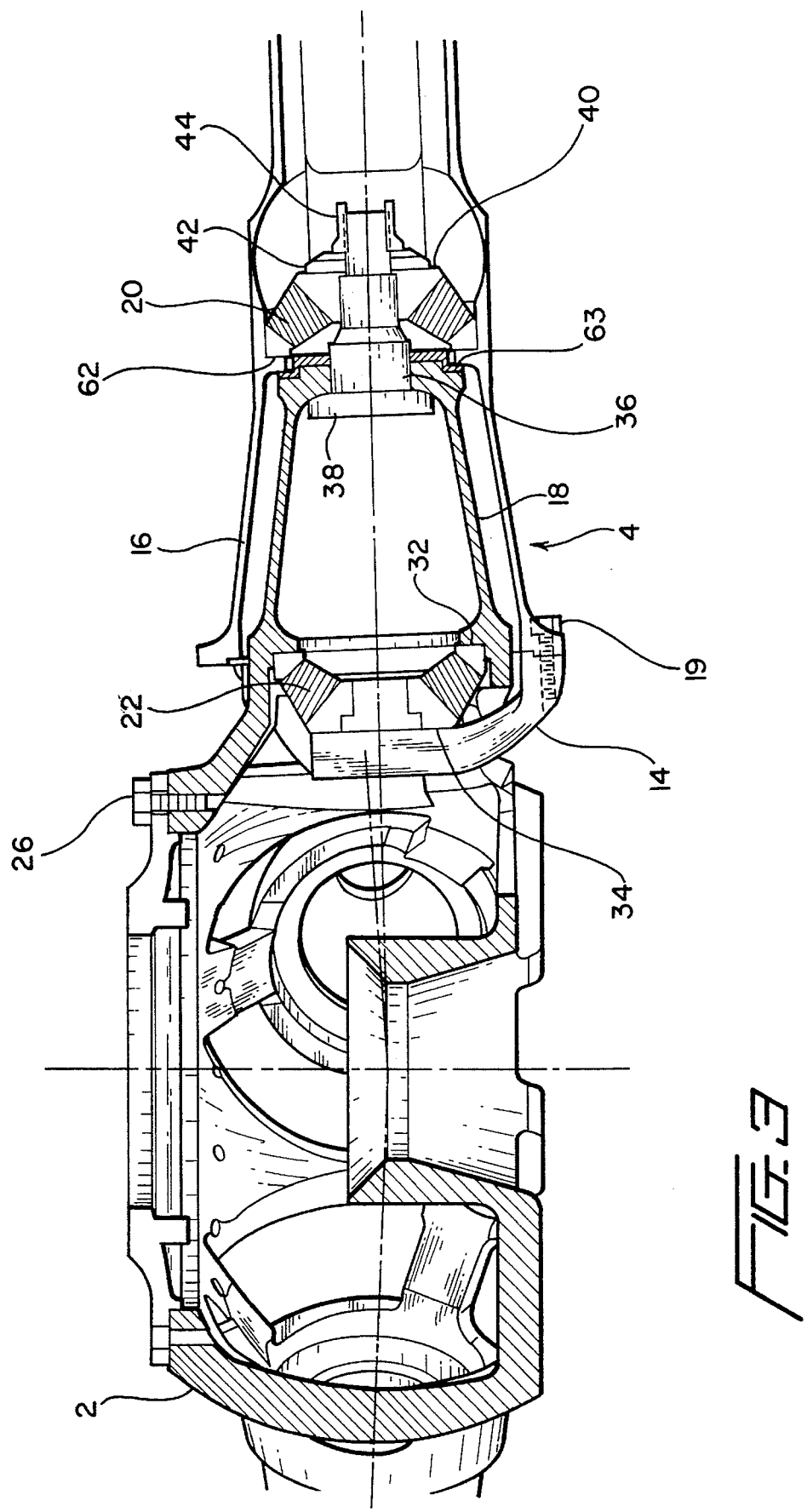
FIG. 3 is a sectional view taken along line 3—3 of FIG. 1.
Figure 5:
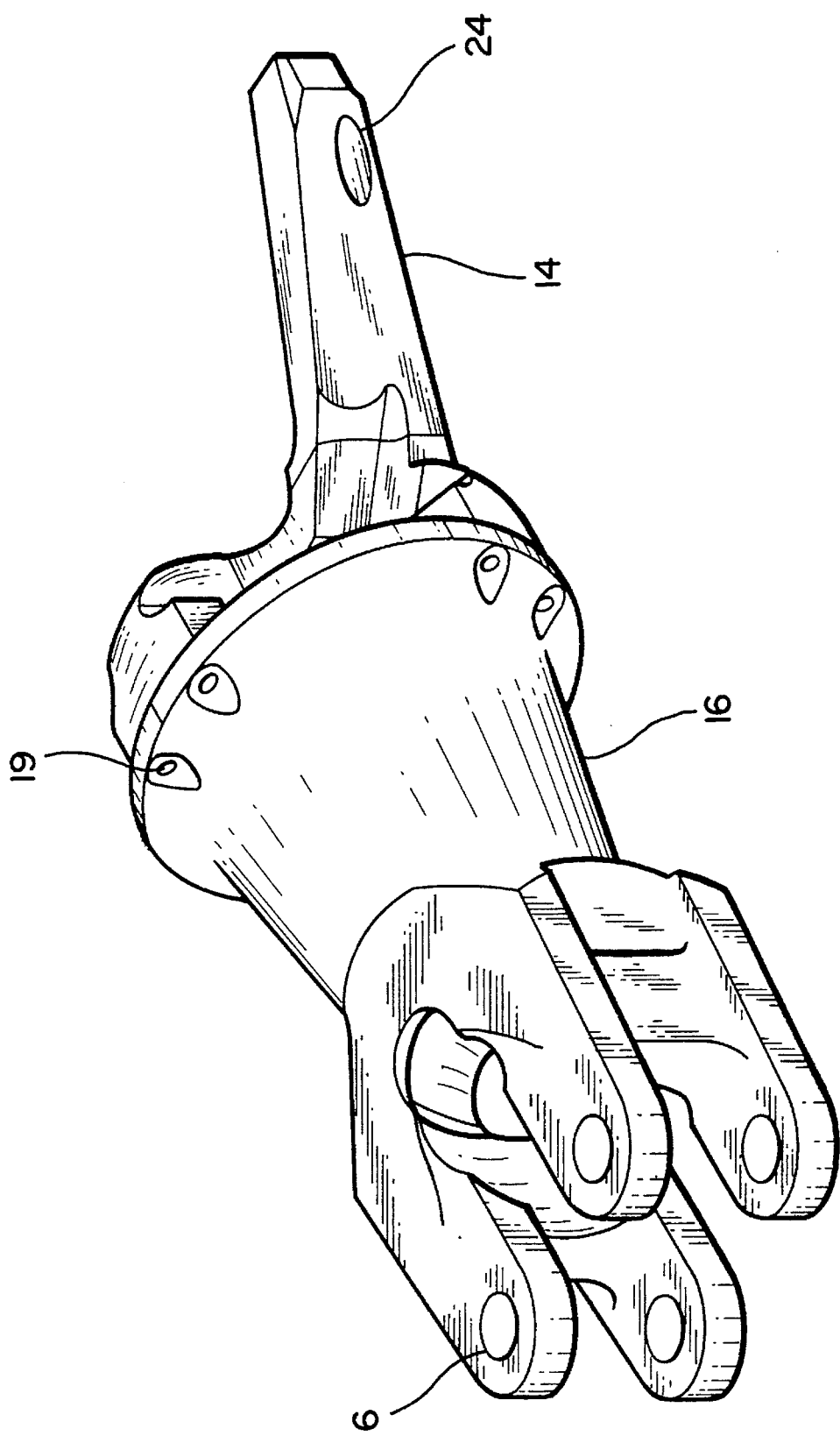
FIG. 5 is an isometric view of one pitch arm of the hub.

Referring now to FIG. 3, there is shown a sectional view of the hub taken along line 3—3 of FIG. 1. In this FIG. 3 the location and functions of the elastomeric blade pitch bearings is illustrated more clearly. As can be seen, the inner cone 18 is attached to the hub barrel 2 by conventional fasteners such as bolts or it may be fabricated as an integral part of the hub barrel. This inner cone, illustrated in more detail in the exploded view of FIG. 4, is provided with three attachment legs 28, evenly spaced about the periphery of the inner end of the cone. Between these legs 28 are spaces 30 which allow the pitch arm attachment points 24 of the pitch arm 14 to be placed inside the hub barrel. The arcuate openings 30 allow the pitch arm to rotate about the blade pitch axis to provide blade pitch motions. This inner cone includes bearing mounting surface 32 which, in conjunction with surface 34 of the pitch arm 14, provides the mounting points for inner elastomeric pitch bearing 22. The outer end of the cone 18 has a central opening in which is inserted pin member 36. Collar 42 is attached to the pin 36 by nut 44. This collar includes bearing mounting surface 40 which, in conjunction with surface 62 on the outer cone 16t provides the mounting means for the outer elastomeric pitch bearing 20. A flanged thrust washer 63 is provided to react inboard axial forces and to serve as a reaction surface for preloading the two conical bearings 20 and 22. These bearings provide the freedom of rotational movement required for blade pitch inputs and also react the blade centrifugal forces and blade moments as a couple. FIG. 5 illustrates, in an isometric view, the outer cone and pitch arm assembly described above.

Referring now to FIGS. 6a and 6b, there is illustrated an alternate embodiment of the invention. In this embodiment, the inner cone has been replaced by an alternate inner member 65. This member is attached to the hub barrel in the same manner as described above. However, instead of being an inner cone shaped member, this inner member 65 provides two flexure webs 67 at each side of the inner member 65. These flexures provide for differences in the blade coning angles when in the fixed wing cruise mode and the hover or helicopter mode. Absent these flexures, the coning angles are adjusted by allowing the rotor blades to be in constant bending during these modes. Provision of these flexures 67 reduces this constant blade bending thus enhancing blade life.

Figure 7:
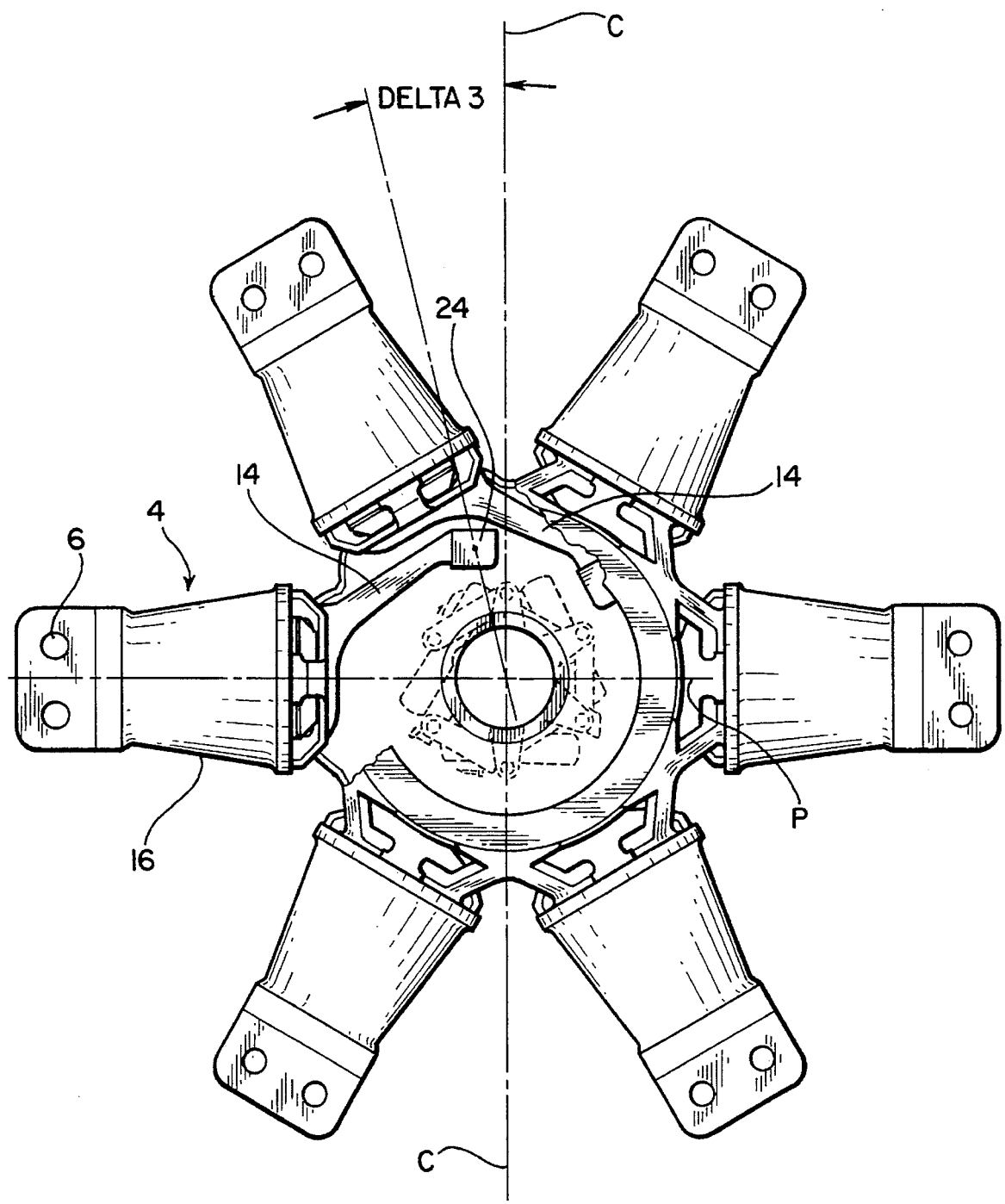
FIG. 7 is a plan view of a hub according to the invention for a six bladed rotor.
Figure 8:
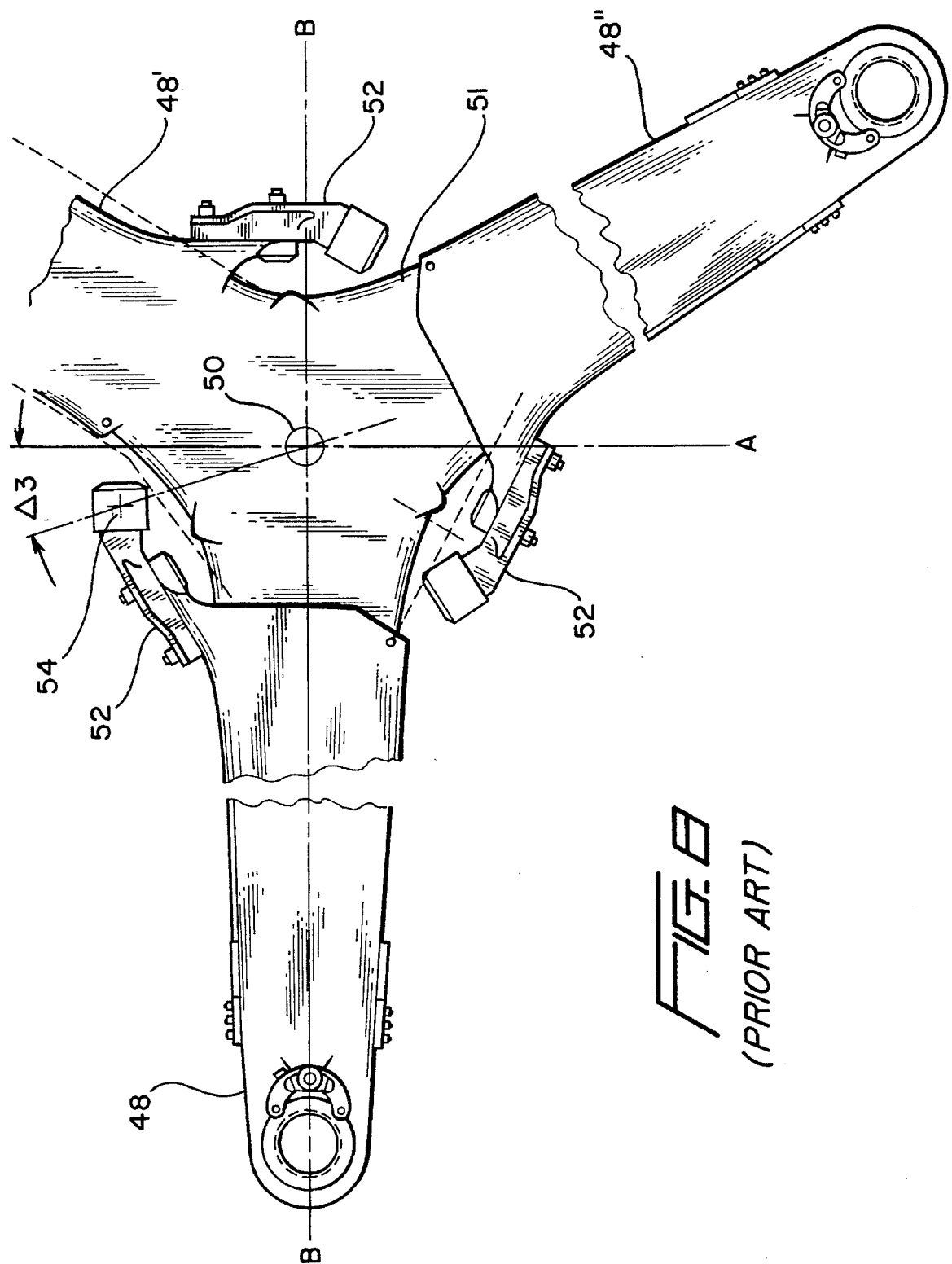
FIG. 8 is a plan view of a prior art three bladed hub.

Referring now to FIGS. 7 and 8 there is illustrated the functional advantages provided by the unique structure of the hub of this invention. FIG. 7 is a plan view of a rotor hub according to the invention. As can be seen, the pitch arms 14 are contained within the hub barrel 2 of the rotor head. Only two of the pitch arms 14 are shown. However, it can be seen that these pitch arms can be located in a circular fashion about the interior opening in the hub barrel and are free to move about their respective blade pitch axes without interfering with each other or other parts of the hub assembly.

As was discussed above in the description of the background of this invention, it is desirable to provide automatic blade pitch inputs when the rotor assembly is subjected to inputs from wind gusts or to sudden large inputs from the pilot of the aircraft. This function is provided by offsetting the pitch arm attachment point from the flap axis of the blade by an angle conventionally designated as Delta 3. This correction is different for conventional rotary wing helicopters than it is for rotary wing aircraft which are convertible to a fixed wing configuration in flight. In a conventional helicopter, when a blade tip is raised suddenly about its flap axis, the appropriate correction is to reduce the angle of blade pitch (flap up-pitch down). For convenience, this will be referred to as positive Delta 3. However, in a tilt rotor aircraft, the opposite correction is required when the aircraft is in the process of converting to fixed wing mode and while in a steady state fixed wing configuration. In the case of a tilt rotor, when a blade tip is raised about its flap axis, the correct response is to increase the angel of blade pitch (flap up-pitch up). For convenience this condition will be referred to as negative DELTA 3. In FIG. 7 this negative Delta 3 is illustrated. The flap axis for the blade fully shown at the extreme left side of the Figure is shown as line C—C of FIG. 7. As was discussed earlier, the flap axis for the blades of this rotor is provided by the universal rotor support bearing. If the Delta 3 correction was zero, the pitch arm attachment point 24 would lie on the flap axis C—C. As illustrated, in this invention the pitch arm attachment point 24 has been offset from the flap axis by the angle designated Delta 3. Thus, when the rotor head teeters about axis C—C because of a wind gust or sudden pilot input, the blade assembly 4 is rotated about its pitch axis D—D causing a change in the blade pitch angle.

Referring now to FIG. 8, there is shown a conventional rotor hub applicable to a tilt rotor aircraft. Here there are provided three rotor blades shown at 48, 48' and 48". Each of the blades is required to rotate about its respective blade pitch axis. One of these axes is illustrated for blade 48 as line B—B. In this conventional design, the pitch arms 52 are located outside of the rotor hub 51. As can be seen, the pitch arm 52 of blade 48 has little clearance with the adjacent blade 48'. If it were desired to add additional blades to this hub, there would be insufficient clearance between blade assemblies.

Thus it can be seen that there is provided by this invention a head for a rotary wing aircraft suitable for a tilt rotor machine which allow the use of a large number of rotor blades while at the same time providing all of the flight control functions required.

What is claimed is:

1. A hub for a rigid rotor rotary wing aircraft for mounting a plurality of rotating airfoil blades for rotation about a rotor shaft spin axis, said hub comprising:

a hub shell having a central opening therethrough having a central axis, the central axis of said central opening lying along the rotor shaft spin axis, said shell being attached to said rotor shaft for rotation therewith;

a plurality of inner members attached to said hub shell for rotation therewith, one of said inner members being provided for each of said blades, said inner members having a blade pitch axis approximately orthogonal to said rotor shaft spin axis;

a plurality of outer members, each outer member enclosing one of said inner members and rotatable about said blade pitch axis with respect to said inner member;

a plurality of pitch housings, each of said pitch housings being attached to the inboard end of one of said outer members nearest said hub for rotation therewith, said pitch housings having a pitch arm extending into the central opening in said hub shell;

a first bearing mounted between each of said inner members and its respective outer member for supporting the outer member for rotation about the blade pitch axis;

a second bearing mounted between each of said pitch housings and its respective inner member for supporting said pitch housing for rotation about the blade pitch axis; and blade attachment means at the outboard end each of said outer members for attaching a rotor blade thereto.

2. The hub according to claim 1 wherein each of said inner members have a flexure beam between its inboard and outboard ends to compensate for different coning angles of individual blades.

3. The hub according to claim 1 wherein said inner and outer members are generally cone shaped, the inner surface of said outer member being substantially concentric with the outer surface of said inner member.

4. The hub according to claim 2 wherein said outer member is generally cone shaped, the inner surface of said outer member substantially surrounding the outer surface of said inner member.

5. The hub according to claim 1 wherein said first and second bearings are elastomeric bearings.

6. The hub according to claim 2 wherein said first and second bearings are elastomeric bearings.

7. The hub according to claim 1 wherein the number of airfoil blades is more than three.

8. The hub according to claim 2 wherein the number of airfoil blades is more than three.

9. The hub according to claim 1 wherein said hub shell is attached to said rotor shaft by means of an elastomeric bearing, said elastomeric bearing providing universal movement of said hub about said rotor shaft spin axis.

10. The hub according to claim 2 wherein said hub shell is attached to said rotor shaft by means of an elastomeric bearing, said elastomeric bearing providing universal movement of said hub about said rotor shaft spin axis.

11. The hub according to claim 9 wherein said elastomeric bearing comprises at least two elastomeric bearings, said bearings being spaced apart along the rotor shaft spin axis.

12. The hub according to claim 10 wherein said elastomeric bearing comprises at least two elastomeric bearings, said bearings being spaced apart along the rotor shaft spin axis.

13. The hub according to claim 3 wherein said first and second bearings are elastomeric bearings.

14. The hub according to claim 4 wherein said first and second bearings are elastomeric bearings.

15. The hub according to claim 13 wherein said hub shell is attached to said rotor shaft by means of an elastomeric bearing, said elastomeric bearing providing universal movement of said hub about said rotor shaft spin axis.

16. The hub according to claim 15 wherein said elastomeric bearing comprises at least two elastomeric bearings, said bearings being spaced apart along the rotor shaft spin axis.

17. The hub according to claim 14 wherein said hub shell is attached to said rotor shaft by means of an elastomeric bearing, said elastomeric bearing providing universal movement of said hub about said rotor shaft spin axis.

18. The hub according to claim 17 wherein said elastomeric bearing comprises at least two elastomeric bearings, said bearings being spaced apart along the rotor shaft spin axis.

* * * * *